(12) United States Patent
Van Wiemeersch et al.

(10) Patent No.: US 10,814,736 B2
(45) Date of Patent: Oct. 27, 2020

(54) WIRELESS VEHICLE CHARGING

(71) Applicant: Ford Global Technologies, LLC, Dearborn, MI (US)

(72) Inventors: John Robert Van Wiemeersch, Novi, MI (US); Thomas Joseph Hermann, Troy, MI (US); Ali Hassani, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 358 days.

(21) Appl. No.: 15/845,969

(22) Filed: Dec. 18, 2017

(65) Prior Publication Data
US 2019/0184841 A1 Jun. 20, 2019

(51) Int. Cl.
*B60L 53/39* (2019.01)
*G01S 13/88* (2006.01)
*B60L 53/12* (2019.01)

(52) U.S. Cl.
CPC ............ *B60L 53/39* (2019.02); *B60L 53/12* (2019.02); *G01S 13/885* (2013.01); *B60L 2250/16* (2013.01); *B60L 2260/32* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 8,463,536 B2* | 6/2013 | Yamamoto | ............. | B60L 53/38 701/300 |
| 8,800,738 B2* | 8/2014 | Urano | .................... | H02J 7/025 191/10 |
| 9,365,126 B2 | 6/2016 | Widmer et al. | | |
| 9,371,007 B1* | 6/2016 | Penilla | ................ | B60L 11/1848 |
| 2012/0095617 A1* | 4/2012 | Martin | ................ | B62D 15/028 701/1 |
| 2012/0203410 A1* | 8/2012 | Wechlin | ................. | B60L 53/36 701/22 |
| 2014/0071279 A1* | 3/2014 | Mokashi | ................. | H04N 7/18 348/148 |

(Continued)

FOREIGN PATENT DOCUMENTS

CN 105389995 A 3/2016
JP 2011217460 A 10/2011

OTHER PUBLICATIONS

Conference Paper—Dec. 2014—IEEE Transactions on Industrial Informatics entitled "Maximizing Power Transfer for Dynamic Wireless Charging Electric Vehicles," https://www.researchgate.net/publication/318235767_Maximizing_Power_Transfer_for_Dynamic_Wireless_Charging_Electric_Vehicles, printed Aug. 22, 2017.

(Continued)

*Primary Examiner* — Tyler D Paige
(74) *Attorney, Agent, or Firm* — Frank A. MacKenzie; Bejin Bieneman PLC

(57) ABSTRACT

A wireless charging system for a vehicle is described, as well as methods of using the system. The system may include a computer programmed with instructions stored in memory and executable by a processor, and a radar device controlled by the computer. One method includes: aligning a reception coil on a vehicle with a charging coil using ground penetrating radar data; and then receiving inductive charge at the reception coil.

19 Claims, 5 Drawing Sheets

(56) References Cited

U.S. PATENT DOCUMENTS

| | | | |
|---|---|---|---|
| 2014/0074352 A1* | 3/2014 | Tate, Jr. | B60L 53/37 701/36 |
| 2015/0035325 A1* | 2/2015 | Gagnier | B60N 2/58 297/188.04 |
| 2015/0061897 A1* | 3/2015 | Kees | B60L 53/126 340/932.2 |
| 2015/0137801 A1* | 5/2015 | Raedy | B60L 53/12 324/207.15 |
| 2015/0175025 A1 | 6/2015 | Barbul et al. | |
| 2015/0231981 A1* | 8/2015 | Kees | G05D 1/0234 701/22 |
| 2016/0025821 A1* | 1/2016 | Widmer | G01R 33/0047 324/258 |
| 2016/0046198 A1* | 2/2016 | Krammer | B60L 53/36 701/22 |
| 2016/0052450 A1* | 2/2016 | Chan | H04W 4/024 340/988 |
| 2016/0159234 A1* | 6/2016 | Lewis | B60R 1/00 701/22 |
| 2016/0332572 A1* | 11/2016 | Gibeau | B60L 53/12 |
| 2016/0380487 A1* | 12/2016 | Widmer | H02J 50/12 324/654 |
| 2016/0380488 A1* | 12/2016 | Widmer | H02J 50/10 324/207.15 |
| 2017/0005523 A1* | 1/2017 | Widmer | B60L 53/126 |
| 2017/0259679 A1* | 9/2017 | Widmer | B60L 53/36 |
| 2017/0361726 A1* | 12/2017 | Widmer | G01S 19/42 |
| 2018/0102730 A1* | 4/2018 | Brusaw | G08G 1/08 |
| 2018/0111494 A1* | 4/2018 | Penilla | G06Q 20/127 |
| 2019/0184841 A1* | 6/2019 | Van Wiemeersch | B60L 53/39 |
| 2019/0308216 A1* | 10/2019 | Perez Romero | B05D 3/207 |
| 2019/0324150 A1* | 10/2019 | Konschak | G01S 19/41 |

OTHER PUBLICATIONS

Hunting, Benjamin article entitled "Qualcomm's Halo wireless EV charging is ready for primetime—SlashGear," dated Apr. 7, 2016, https://www.slashgear.com/qualcomms-halo-wireless-electric-vehicle-charging-technology-is-ready-for-prime-time-07435352/, printed Aug. 22, 2017.

* cited by examiner

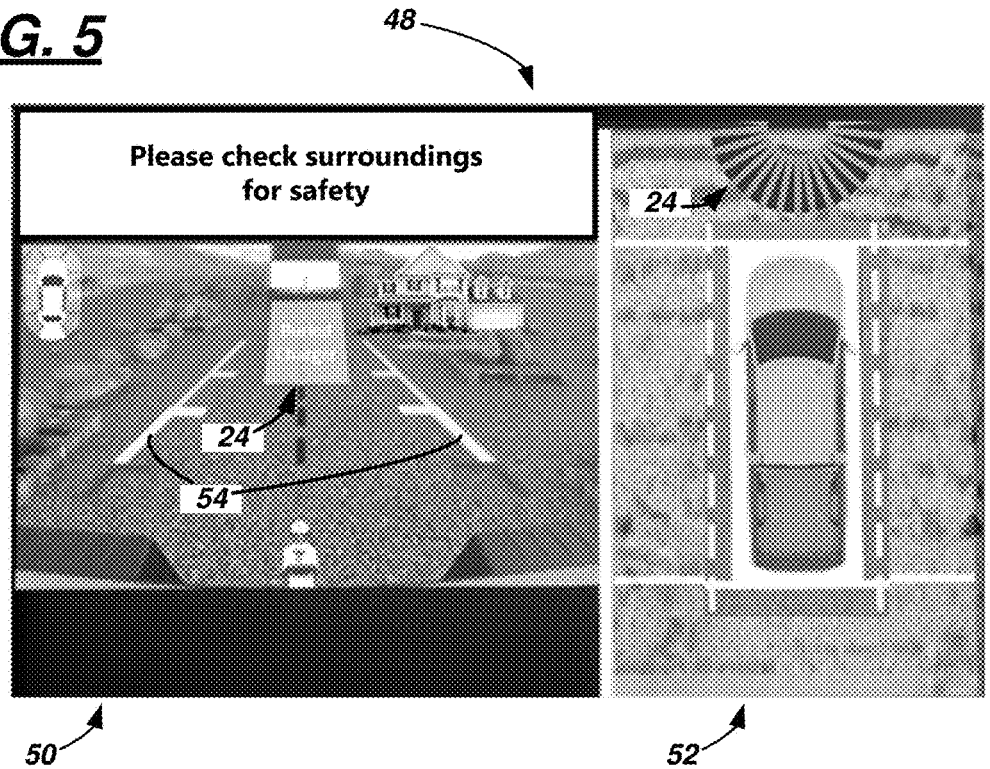
FIG. 5
FIG. 6
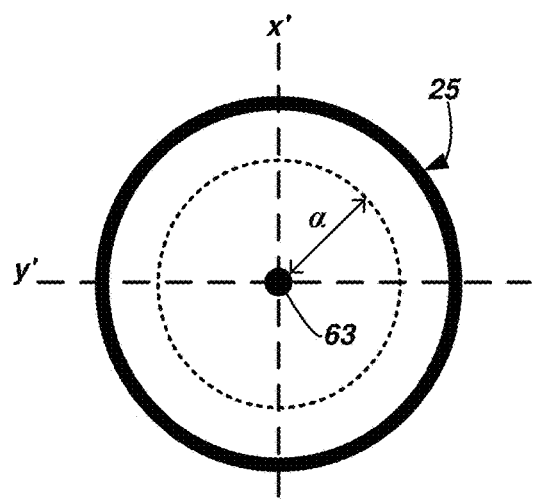
FIG. 10

WIRELESS VEHICLE CHARGING

BACKGROUND

Some electric vehicles may have wireless charging technology. For example, vehicle owners may be able to wirelessly charge their vehicles within their home garages. Setup may comprise a transmitter pad located atop a floor in the garage, and one or more visual indicia. The visual indicia may include markers on the floor, markers on the walls, markers suspended from the ceiling, etc. Further, the visual indicia may correspond with the location of the block charger and a location of a wireless charging receiver on an underside of the vehicle. Thus, when the user drives the vehicle into the garage, he or she may align a feature on the vehicle laterally and longitudinally with the visual indicia and thereby also align the receiver with the transmitter.

BRIEF DESCRIPTION OF THE DRAWINGS

FIGS. 5-6 are illustrative views of a screen of a human-machine interface (HMI) device, illustrating the vehicle relative to the charging station.

FIG. 10 is a schematic view of an alignment between the charging coil of the charging station and a reception coil of a receiver in the vehicle.

DETAILED DESCRIPTION

Figure 1:
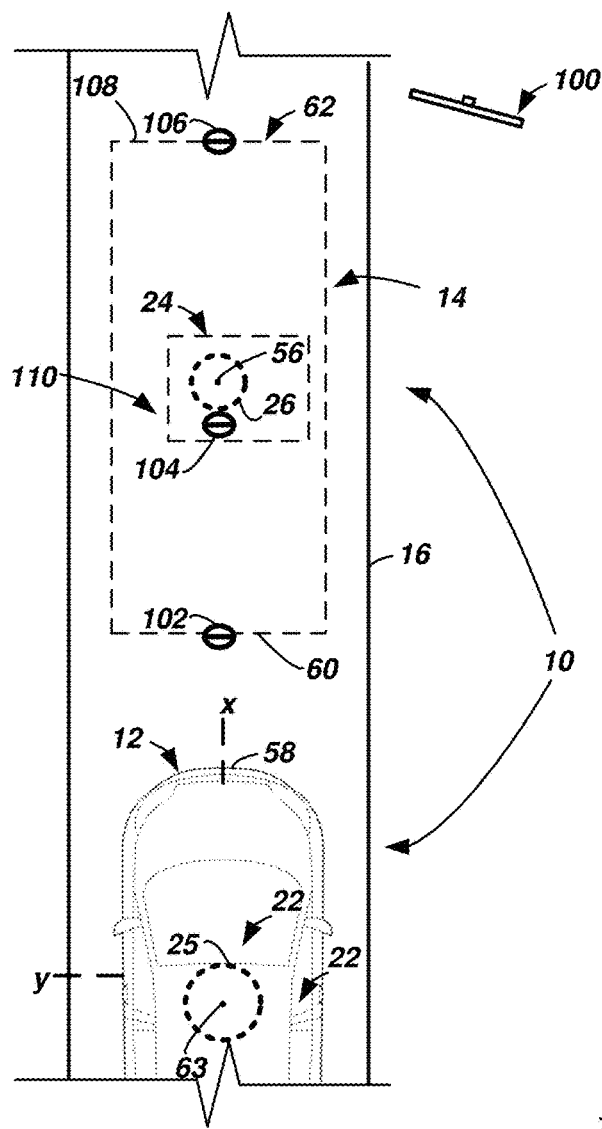
FIG. 1 is a schematic diagram of a geofence region within a section of roadway, the region including a wireless charging station.
Figure 2:
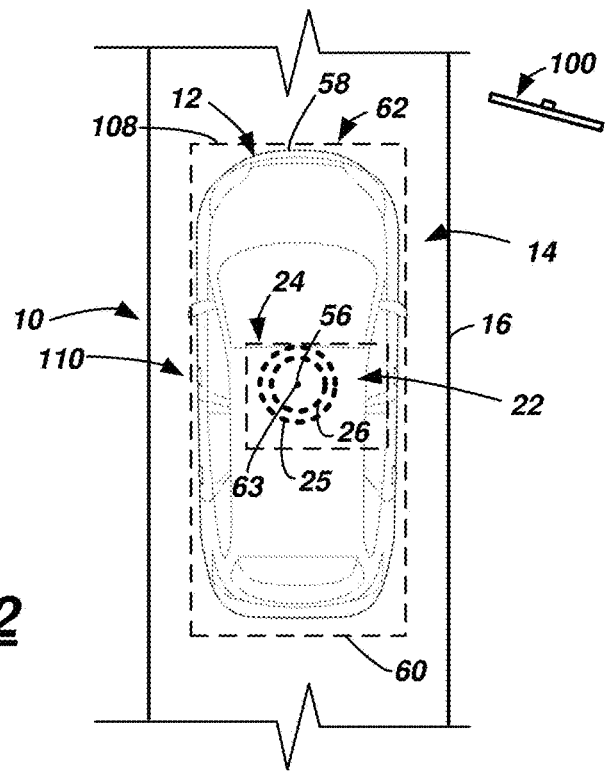
FIG. 2 illustrates a vehicle positioned within the geofence region of FIG. 1.

A wireless charging system for a vehicle is described. According to one illustrative method example using the system, the method includes: determining when a vehicle is within a geofence region that includes a charging coil embedded within a roadway; and aligning a reception coil on the vehicle with the transmitting charging coil using ground penetrating radar data.

According to the at least one example set forth above, further comprising: receiving, via a human machine interface (HMI) device, an indication from a user prior to determining and aligning.

According to the at least one example set forth above, the indication is based on roadway pressure sensor data.

According to the at least one example set forth above, the indication is based on wireless signal strength data, angle of arrival data, or time of flight data.

According to the at least one example set forth above, determining further comprises displaying an image of the vehicle and a charging station on a human machine interface (HMI) device.

According to the at least one example set forth above, displaying further comprises transitioning from a split-screen mode to a full-screen mode as the vehicle moves into the region.

According to the at least one example set forth above, the charging coil is in an inactive state during aligning.

According to the at least one example set forth above, further comprising charging a battery of the vehicle via the reception coil.

According to the at least one example set forth above, further comprising, when a threshold level of charge is received, transmitting a message, to a controller of the charging coil, to terminate charging.

According to the at least one example set forth above, aligning further comprises autonomously controlling the vehicle using dead reckoning.

According to the at least one example set forth above, aligning further comprises determining whether an axis of a reception coil on the vehicle is within a threshold distance of a centroid of the charging coil.

According to the at least one example set forth above, aligning further comprises increasing a radar signal frequency as the vehicle approaches the charging coil.

According to the at least one example set forth above, during the aligning, the vehicle is in a fully-autonomous mode.

According to another illustrative method example, a method includes: aligning a reception coil on a vehicle with a charging coil using ground penetrating radar data; and then receiving inductive charge at the reception coil.

According to the at least one example set forth above, the charging coil is in an inactive state during aligning.

According to the at least one example set forth above, aligning further comprises autonomously controlling the vehicle using dead reckoning.

According to the at least one example set forth above, aligning further comprises determining whether an axis of the reception coil is within a threshold distance of a centroid of the charging coil.

According to the at least one example set forth above, aligning further comprises increasing a radar signal frequency as the vehicle approaches the charging coil.

According to another illustrative example, a system includes: a processor; and memory storing instructions executable by the processor, the instructions comprising, to: align a reception coil on a vehicle with a charging coil in or on the ground using ground penetrating radar data; and then, receiving inductive charge at the reception coil.

According to the at least one example set forth above, further comprising: an antenna circuit, comprising at least one antenna, configured to transmit and receive an ultra-wide band radio wave frequency.

According to the at least one example, a computer is disclosed that is programmed to execute any combination of the examples of the method(s) set forth above.

According to the at least one example, a computer program product is disclosed that includes a computer readable medium that stores instructions executable by a computer processor, wherein the instructions include any combination of the examples of the method(s) set forth above.

Turning now to the figures wherein like numerals represent like or identical features or elements, a wireless charging system 10 is shown for a charging a vehicle 12. The system 10 includes a charging station 14 (e.g., located in a portion of roadway 16) and an alignment system 20 onboard the vehicle 12 (see FIGS. 1-4). Among other things, system 20 utilizes ground penetrating radar to assist in precision alignment of a receiver 22 onboard the vehicle 12 with a transmitter 24 of the charging station 14. In this manner, system 20 does not require the visual identification of above-ground objects and/or roadway markings to align a reception coil 25 of the receiver 22 with a charging coil 26 of the transmitter 24. Further, the charging station does not need to waste power sending a locating beacon. Thus, as will be described more below, the system 20 is suitable in many outdoor environmental conditions—e.g., including scenarios wherein the above-ground objects and/or roadway markings do not exist, the roadway markings are worn or weathered, and/or the markings are covered with leaves, snow, dirt or other debris, etc.

FIGS. 1-4 illustrate vehicle 12 comprising the alignment system 20. Vehicle 12 is shown as a passenger car; however, vehicle 12 could also be a truck, sports utility vehicle (SUV), recreational vehicle, bus, or the like that includes system 20. Vehicle 12 may be an electric vehicle. As used herein, an electric vehicle is any vehicle that relies primarily on electric energy for propulsion and operation; non-limiting examples include battery electric-vehicles, hybrid electric vehicles, and plug-in hybrid electric vehicles, and other electric vehicles variants.

Vehicle 12 may be operated in any one of a number of autonomous modes. In at least one example, vehicle 12 may operate as an autonomous taxi, autonomous school bus, or the like—e.g., operating in a fully autonomous mode (e.g., a level 5), as defined by the Society of Automotive Engineers (SAE) (which has defined operation at levels 0-5). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention. In at least one example, vehicle 12 at least includes computer-executed instructions that facilitate a so-called Park Assist program, wherein using programmed instructions executed by one or more onboard computers, vehicle 12 can park itself with accuracy without human interaction—e.g., using dead reckoning technology.

Figure 3:
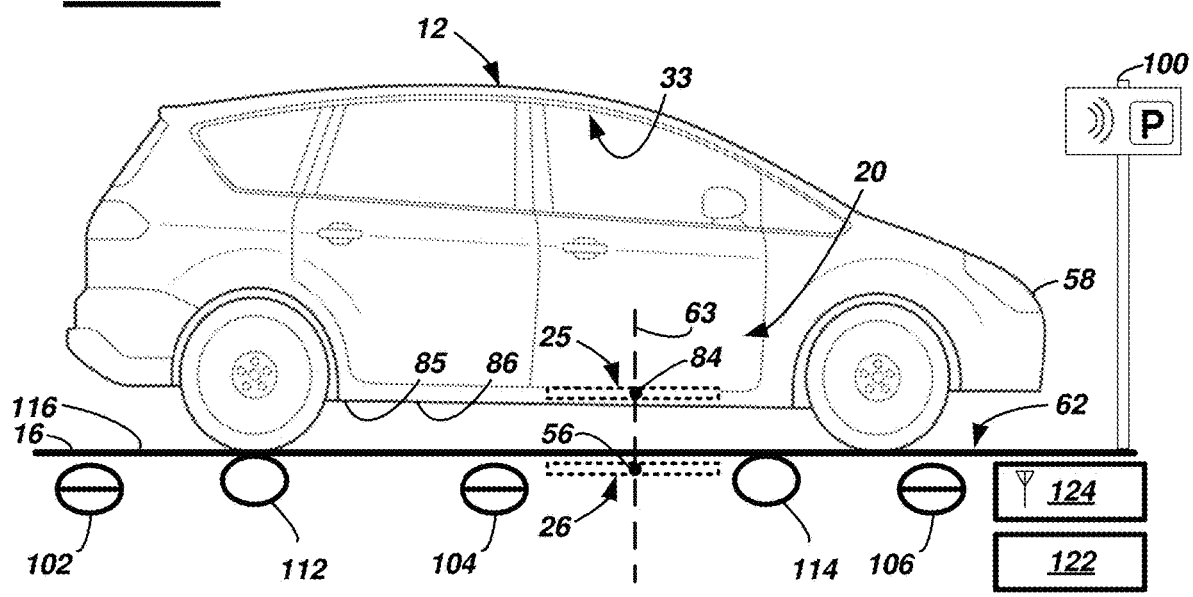
FIG. 3 is a schematic side view of the vehicle in the geofence region, aligned with a charging coil of the charging station.
Figure 4:
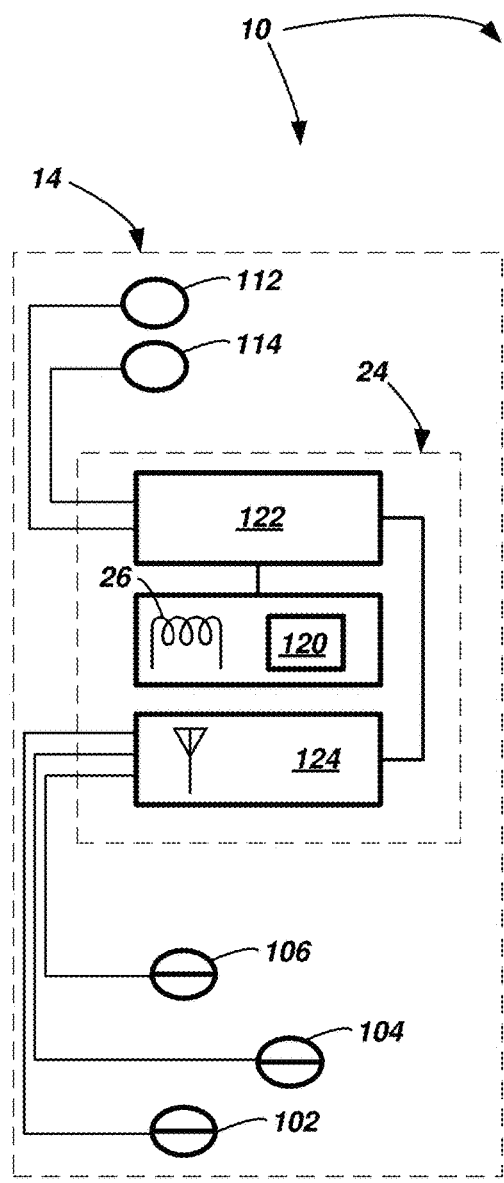
FIG. 4 illustrates electrical schematic views of the vehicle and the charging station.
Figure 4:
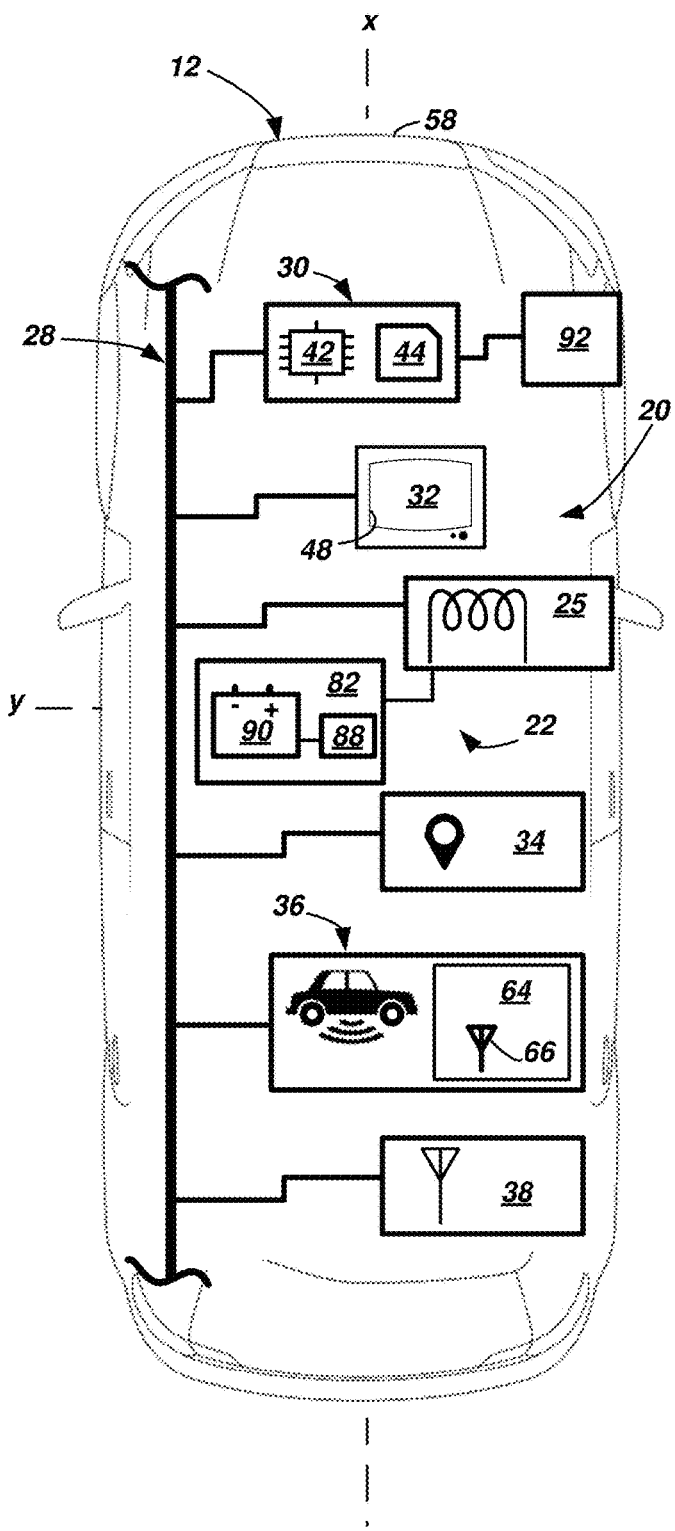

As shown in FIGS. 3-4, the alignment system 20 of vehicle 12 may comprise a wired and/or wireless communication network connection 28 that interconnects and facilitates communication between, among other things: a computer 30 configured to control the receiver 22 and to control vehicle positioning relative to the charging coil 26; a human-machine interface (HMI) device 32 suitable for users within a vehicle cabin 33, which receives user input data and/or provides output data (related to vehicle charging); a navigation system 34 that receives and/or processes onboard inertial data used for dead reckoning; a radio detection and ranging (radar) system 36 which may be used to penetrate the ground and identify charging coil 26 therein; a telematics device 38 used to communicate with, among other things, charging station 14; and the receiver 22 used to receive a wireless charge from the charging station 14.

Communication network connection 28 may comprise one or more of a controller area network (CAN) bus, Ethernet, Local Interconnect Network (LIN), a fiber optic connection, or the like usable with any suitable communication protocol. Network connection 28 is not limited to data bus implementations; e.g., alternatively or in combination therewith, connection 28, may comprise one or more discrete wired or wireless connections.

Computer 30 may comprise at least one processor 42 and memory 44. Processor 42 may be programmed to process and/or execute digital instructions to carry out at least some of the tasks described herein. Non-limiting examples of processor 42 include a microprocessor, a microcontroller or controller, an application specific integrated circuit (ASIC), etc.—just to name a few. And a few non-limiting examples of digitally-stored instructions—storable in memory 44 and executable by processor 42—include, to: determine a trigger regarding a geofence region for wireless charging; receive positioning data from one or more cameras, wireless nodes, or the like; locate charging coil 26 in the ground; identify a shape of charging coil 26; determine a centroid of the identified shape; use ground penetrating radar data to align vertically an axis of reception coil 25 with the centroid of charging coil 26; use dead-reckoning instructions during the alignment; determine whether wireless charging is complete; and store a geotag of the location for future charging events. Additional examples of instructions which may be used instead of and/or in addition to these examples, as well as sequences of instructions, are described in the one or more processes below.

Memory 44 may include any non-transitory computer usable or readable medium, which may include one or more storage devices or articles. Exemplary non-transitory computer usable storage devices include conventional hard disk, solid-state memory, random-access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 44 may store one or more computer program products which may be embodied as software, firmware, or other programming instructions executable by the processor 42.

Human-machine interface (HMI) device 32 may include any suitable input and/or output devices such as switches, knobs, controls, displays, audio sources, etc.—e.g., on a vehicle instrument panel, on a steering wheel, elsewhere in vehicle 12, or a combination thereof. In one non-limiting example, HMI device 32 may comprise a screen 48 for displaying navigation and positioning information pertinent to charging vehicle 12. In some examples, screen 48 is an interactive touch screen; however, this is not required.

Screen 48 may be segmented using hardware and/or software. According to at least one example, screen 48 is segment-able using software into two portions 50, 52 (e.g., a split-screen mode)—e.g., see exemplary screenshot shown in FIG. 5. In this example, the first portion 50 of screen 48 may be displaying a front or rear view of the vehicle 12 (e.g., selectively switchable by HMI device 32 and/or computer 30 based on an input received indicating a transmission state of the vehicle being in DRIVE (forward mode) or REVERSE, respectively)—in this instance, a rear view screenshot is shown. The second portion 52 of screen 48 may display—from a top view (or so-called bird's-eye perspective) of the vehicle 12—a representation of the transmitter 24 buried within a representative roadway, relative to a representative position of the vehicle 12. Screen 48 may illustrate other features, images, icons, text, etc. as well. For example, portion 50 in FIG. 5 shows projected path indicia 54 useful in assisting a user (or computer 30) in aligning the vehicle 12 with transmitter 24.

FIG. 6 is an exemplary screenshot showing a full- or non-split-screen mode implementation. In this example, portion 52 may be expanded (by HMI device 32 and/or computer 30) to fit an entirety (or nearly an entirety) of screen 48. The top view could include an overlay of the detected coil. Of course, the screenshot illustrations of FIGS. 5-6 are merely examples and other suitable data may be displayed in addition thereto or instead thereof.

According to one example, when vehicle 12 approaches a threshold distance of transmitter 24, HMI device 32 (and/or computer 30) are programmed with instructions to change or transition the image from a split screen (e.g., FIG. 5) to a full screen (e.g., FIG. 6). According to one example, the threshold distance corresponds with a length of a vehicle (e.g., such as vehicle 12). According to another example, the threshold distance is less than a vehicle length and corresponds with a distance between a centroid 56 of charging coil 26 (transmitter 24) and a front end 58 of vehicle 12 (FIG. 1). According to one example, the threshold distance corresponds with a boundary 60 of a geofence region 62; thus, in this example, HMI device 32 (and/or computer 30) may be programmed with instructions to change the image from a split screen (e.g., FIG. 5) to a full screen (e.g., FIG. 6) when vehicle 12 crosses a boundary into the geofence region 62. As used herein, a geofence region is an area of roadway 16 which includes embedded charging coil 26. In at least some examples, data received from the charging station 14 may assist computer 30 in the lateral and longitudinal alignment of the vehicle 12 within the geofence region 62, and thus the alignment of the reception coil 25 (receiver 22) to charging coil 26 (transmitter 24).

Geofence region 62 includes one or more boundaries defining an enclosed area (e.g., it may be elliptical, rectangular, or have any other suitable shape). In some examples, the geofence region 62 may be less than or equal to 1200 square feet (e.g., 240 inches by 720 inches). Also, as used herein, the term roadway means an area of earth beneath the vehicle 12 or an area of a structure between the vehicle 12 and earth, beneath the vehicle 12. Thus, roadway may comprise dirt, grass, asphalt, concrete, gravel, wood planks, brick, etc. Additional aspects of geofence region 62 and uses thereof will be described more below.

Returning to FIG. 4, navigation system 34 may comprise one or more sensors such as a satellite positioning system (e.g., such as Global Positioning System (GPS) unit and a Global Navigation Satellite System (GLONASS)), motion sensors (e.g., such as accelerometers), rotation sensors (e.g., gyroscopes), vehicle wheel encoders and the like, and/or other inertial measurement unit (IMU) devices. Navigation system 34 may be configured and/or programmed with instructions to determine dead reckoning of vehicle 12 and/or provide dead reckoning data to computer 30—e.g., thereby enabling computer 30 to determine vehicle dead reckoning. As described below, dead reckoning and other equivalent systems may be used to accurately position a vertically downwardly extending axis 63 of reception coil 25 relative to centroid 56 of charging coil 26 (as best shown in FIG. 3). According to one non-limiting example, via computer-control and dead reckoning techniques, a movement of vehicle 12 (via computer 30) so that axis 63 may be within a 0-5 centimeter (cm) distance of centroid 56 is possible. In this manner, wireless charge efficiency may be increased—e.g., wherein efficiency is defined as electrical energy transferred from charging coil 26 to reception coil 25 per unit time (kilo-Joule/second).

Returning to FIG. 4, radar system 36 may comprise an antenna circuit 64 that comprises at least one antenna 66 adapted to transmit signals and receive signal returns using an ultra-wide band (UWB) radio wave frequency. More particularly, radar system 36, via the at least one antenna 66 may be used to facilitate ground penetrating radar (GPR) (e.g., also referred to as ground-probing surface penetrating radar (SPR)). Using radar system 36 as a GPR device, computer 30—among other things—may locate charging coil 26, determine a two- or three-dimensional shape thereof, and determine corresponding centroid 56.

Radar system 36 may utilize any suitable non-destructive, GPR techniques, including but not limited to polarization, dual polarization, image fusing, noise reduction, clutter suppression, statistical analysis, synthetic aperture techniques, matched-filter techniques, and the like. According to one example, antenna circuit 64 uses UWB frequencies in a range of 210 MegaHertz (MHz)-2.5 GigaHertz (GHz). According to at least one example, the operating frequency of antenna circuit 64 may be constrained within 210-800 MHz. According to at least one example, the operating frequency of antenna circuit 64 may be 500 MHz. As explained below, in at least one example, the operating frequency of the antenna circuit 64 may be tunable so that frequency may be increased as a result of vehicle 12 moving closer to charging coil 26.

FIG. 4 illustrates antenna circuit 64 having a single antenna (antenna 66). This circuit 64 may comprise other circuit components (not shown)—e.g., including other discrete components (e.g., capacitors, resistors, switches, etc.), filter circuits, mixer circuits, and the like. According to one example, antenna 66 may be located in any suitable vehicle location—including proximate to reception coil 25 (receiver 22—e.g., within two feet thereof).

Figure 7:
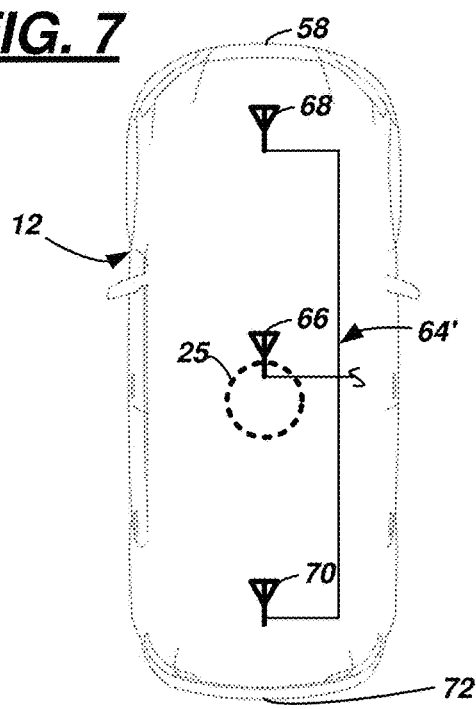
FIGS. 7-8 are schematic views of exemplary antenna circuits in the vehicle.

Other antenna circuit examples also exist. For example, as shown in FIG. 7, an antenna circuit 64' may comprise multiple antennas 66, 68, 70. In this example, antenna 66 may be located proximate to coil 25 of receiver 22 (e.g., within two feet), antenna 68 may be located closer to front end 58, and antenna 70 may be located closer to a rear end 72 of vehicle 12.

Figure 8:
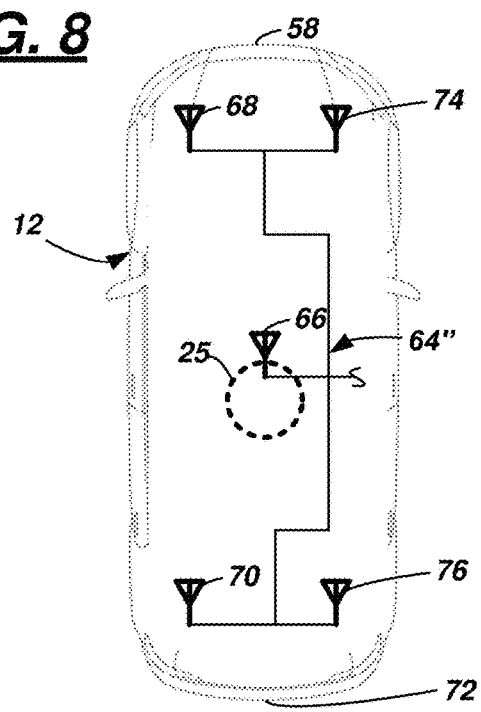

According to another antenna arrangement (see FIG. 8) and by way of example only, an antenna circuit 64" may comprise antenna 66 located in a similar location with respect to vehicle 12. Antennas 68, 74 may be located toward the vehicle's front end 58, and antennas 70, 76 may be located closer toward the vehicle's rear end 72. While one antenna (66) is shown nearer the reception coil 25, this is not required. The illustrative arrangements of FIGS. 7-8 may be used to improve resolution, GPR quality, better re-construct a three-dimensional envelope of the buried charging coil 26, and the like—e.g., by computer 30 receiving and processing an increased quantity signal data.

Returning to FIG. 4, telematics device 38 may be any suitable telematics computing device configured to wirelessly communicate with other electronic devices—e.g., including a charging station 14, mobile devices, and other vehicles. Such wireless communication via telematics device 38 may include use of cellular technology (e.g., LTE, GSM, CDMA, and/or other cellular communication protocols), short range wireless communication technology (e.g., using Wi-Fi, Bluetooth, Bluetooth Low Energy (BLE), dedicated short range communication (DSRC), and/or other short-range wireless communication protocols), or a combination thereof. Such communication includes so-called vehicle-to-vehicle (V2V) and vehicle-to-infrastructure (V2I) communications as well—all of which will be appreciated by those skilled in the art. According to at least one example, short range wireless communication between vehicle 12 and charging station 14 via telematics device 38 includes one of: DSRC, a Wi-Fi protocol, a Wi-Fi Direct protocol, Bluetooth, or BLE.

Receiver 22 may comprise reception coil 25 and a power management system 82 which facilitates the delivery of energy to the vehicle 12. Coil 25 may comprise any suitable arrangement of conductive wire (e.g., any suitable gauge wire, any suitable number of turns, any suitable shape or arrangement, etc.). Like charging coil 26, reception coil 25 may have a centroid 84 and a corresponding axis 63 (as discussed above; e.g., see FIG. 3). According to an exemplary arrangement, coil 25 is mounted to a frame 85 of vehicle 12 and carried on an underside 86 thereof. In this manner, vehicle 12 may drive over the charging coil 26 and, based on control by computer 30, locate its coil 25 relative thereto.

Returning to FIG. 4, the power management system 82 may comprise any suitable electronics for converting induced current through coil 25 into storable energy. According to the illustrated example, system 82 comprises an AC-DC inverter 88 and a battery 90. Using techniques known in the art, the inverter 88 receives alternating current from coil 25 (e.g., induced by alternating current through coil 26) and converts the alternating current to direct current—thereby permitting it to be stored in battery 90.

As shown in FIG. 4, vehicle 12 also may comprise a sensor suite 92—e.g., shown coupled to computer 30. Sensor suite 92 may comprise one or more imaging devices (e.g., such as cameras, laser ranging and detection devices, etc.), one or more short range wireless communication nodes (e.g., with receive (RX) and/or RX/transmit (TX) capability), and the like. These and other sensor devices may be adapted to facilitate computer-driving in a fully- or partially autonomous mode. As explained below, devices of sensor suite 92 may identify markings on roadway 16 (where they exist or are not worn off), may identify signage 100 (see FIGS. 1-3) indicating that a charging station 14 is present, or may receive and/or communicate with one or more communication nodes 102, 104, 106 of charging station 14 (e.g., thereby facilitating alignment of vehicle 12 within geofence region 62).

Returning again to FIGS. 3-4, an example of the charging station 14 is illustrated. Station 14 may comprise a portion of roadway 16—having one or more communication nodes (e.g., 102-106) coupled to (or embedded within) roadway 16—and transmitter 24. The portion of roadway 16 may include the geofence region 62, described above. In some instances, roadway 16 includes a parking area—e.g., a roadside pull-off or parking lot. The nodes are not required; further, the quantity may vary from implementation to implementation. In the illustrated example, the nodes 102-106 are short-range wireless transmitters or transceivers coupled to and controlled by the transmitter 24. According to at least one example, the nodes 102-106 are configured to provide wireless signals to assist sensors onboard vehicle 12 (corresponding nodes adapted to receive transmissions and assist computer 30 in identifying a relative distance based on signal strength, angle of arrival, time of flight, etc.). Thus, in one example, the communications nodes of suite 92 may be configured to operate according to one of: DSRC, a Wi-Fi protocol, a Wi-Fi Direct protocol, Bluetooth, or BLE.

According to one example (see FIGS. 1-3), a location of node 102 corresponds with an entry boundary 60 (of geofence 62), a location of node 106 corresponds with an exit boundary 108 of geofence region 62, and a location of node 104 corresponds with a central region 110 of geofence region 62. In this manner, using wireless transmissions from nodes 102-106, computer 30 onboard vehicle 12 (via its communication nodes of sensor suite 92) may locate vehicle 12 roughly within geofence region 62 (e.g., locating coils 25, 26 within a first threshold distance of one another). As explained below, thereafter, computer 30 may use GPR and dead reckoning techniques to locate coils 25, 26 relative to one another within a second threshold distance, wherein the second threshold distance is smaller than the first threshold distance.

In at least one example (FIGS. 3-4)—which may be used alternatively or in combination with the nodes 102-106—roadway 16 comprises one or more pressure sensors 112, 114 as well—e.g., embedded within an upper surface 116 of roadway 16 so that when a threshold force is exerted upon the sensors 112, 114 (e.g., corresponding to an identifiable weight of a roadway vehicle), then sensors 112, 114 provide an indication to transmitter 24 that a vehicle is within the geofence region 62. Still other examples exist.

As best shown in FIG. 4, transmitter 24 may comprise coil 26, a power source 120, a controller 122, and a telematics device 124 having an independent antenna and also being coupled to the one or more communication nodes (e.g., 102-106). Charging coil 26 may be similar or identical to reception coil 25; therefore, features and characteristics thereof will not be re-described here. Coil 26 is embedded within the roadway 16—as used herein, embedded means entirely below surface 116 or at least partially below surface 116. For example, coil 26 may be located 0.1-1.0 meters below surface 116.

Power source 120 may be any electronic device for providing power to drive the charging coil 26. For example, source 120 may provide alternating current through coil 26 at any suitable current and voltage. Further, source 120 selectively may be actuated by controller 122.

Controller 122 may be any suitable computer or computing device having a processor (not shown) and memory (not shown). For example, controller 122 may be programmed with executable instructions to: selectively control actuation of the coil 26 based on determining a vehicle is within the geofence region 62—e.g., using sensor data from nodes 102-106 and/or from sensors 112, 114; control the amount of transmitted power from coil 26; communicate with vehicles (such as vehicle 12) via telematics device 124 (which may be the similar or identical to device 38—thus, it will not be re-described herein); and execute other suitable instructions. As explained more below, vehicle 12 may align its reception coil 25 with charging coil 26 even when the power to coil 26 is in an inactive state—e.g., using ground penetrating sensing techniques. In this manner, energy is conserved, as coil 26 need not be live or operational in order for computer 30 to align coil 25 with coil 26. Accordingly, and as explained below, once computer 30 communicates (using telematics device 38) to telematics device 124 (of charging station 14) that the coils 25, 26 are adequately aligned, controller 122 may change charging coil 26 from the inactive state to an active state and commence wireless charge transfer.

Figure 9:
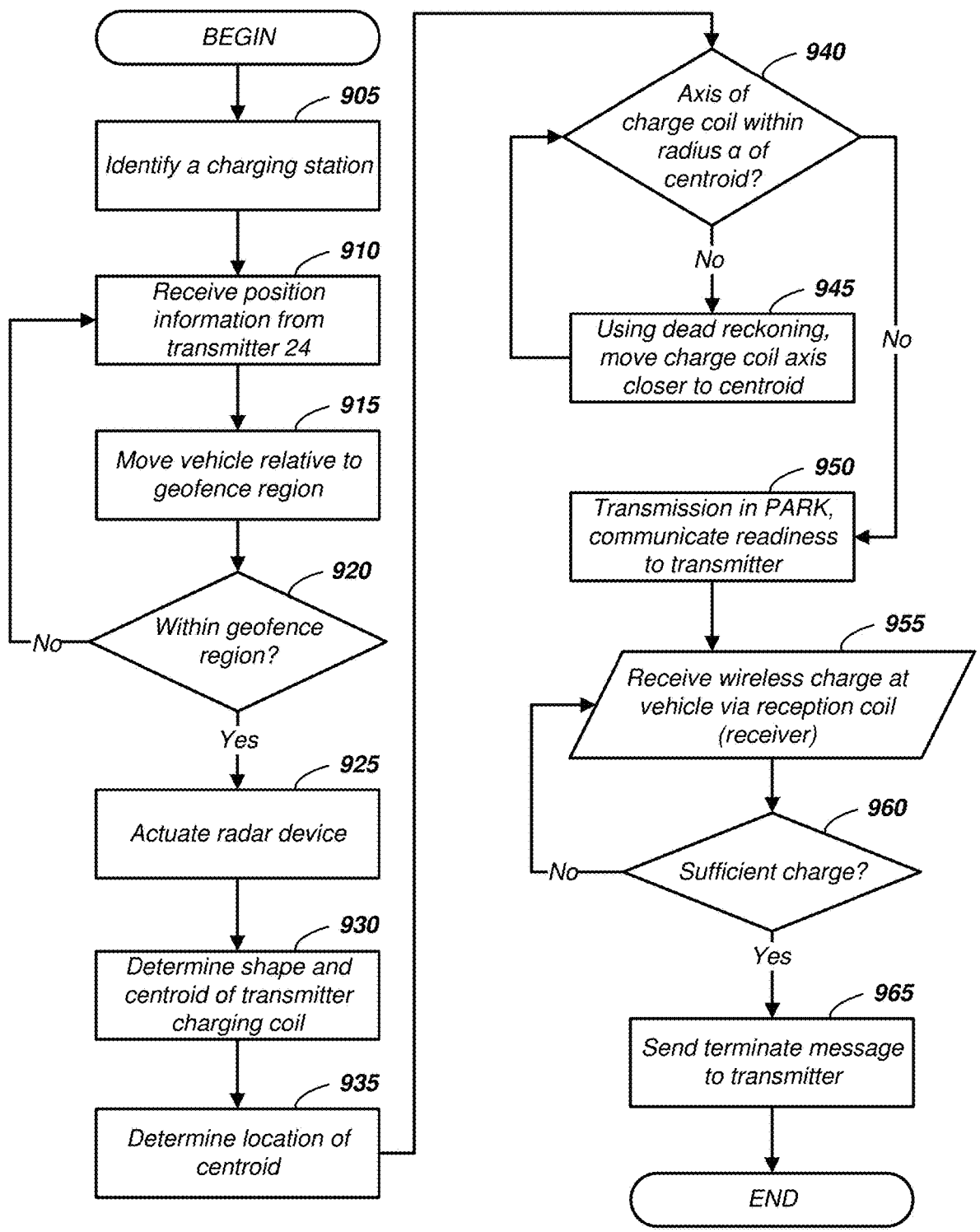
FIG. 9 is a flow diagram illustrating an exemplary process of receiving a wireless charge from the charging station using ground penetrating radar.

Now turning to FIG. 9, a process 900 of wirelessly charging vehicle 12 via charging station 14 is illustrated—i.e., a process of aligning coils 25, 26 and also charging battery 90 via reception coil 25. The process comprises a plurality of instructions described below as logic blocks. The process may begin with block 905 wherein charging station 14 is identified. According to at least one example, vehicle 12 is operating in a fully autonomous mode (e.g., level 5). In these such examples, computer 30 may identify the charging station 14 in a variety of ways—e.g., including but not limited to: receiving (via sensor suite 92) image data and using the data, identifying visual indicia such as signage 100 or roadway markings; recalling from memory 44 a stored geotag associated with the charging station 14 and, using navigation system 34, determining that vehicle 12 is approaching the station 14; and/or receiving a wireless message indicating its proximity—e.g., from station 14, from another vehicle via V2V, from a remote server, or the like.

When a human is at least partially operating vehicle 12 (e.g., according to autonomous levels 0-4), then the HMI device 32 may display information regarding the proximity of the charging station 14. For example, computer 30 may determine a charge level of battery 90, and when the charge level is less than a threshold, computer 30 may cause HMI device 32 to provide a notification to the driver that it is approaching charging station 14.

In block 910 which follows, computer 30 may communicate wirelessly with charging station 14—e.g., telematics device 38 to telematics device 124. According to one example, computer 30 may obtain position information (e.g., GPS coordinate data or the like). In some examples, block 910 may be skipped as this information may be acquired during block 905 (or e.g., a human driver may determine the position information using line-of-sight, signage, etc.).

In block 915, the vehicle 12 is moved toward the charging station 14—and more particularly, in at least one example, toward geofence region 62. In the fully autonomous mode, computer 30 may drive autonomously toward and at least partially into the geofence region 62. According to one example, this may be accomplished using GPS coordinate data. In another example, vehicle 12 may drive within a threshold distance of above-ground signage 100 (e.g., within 5-20 feet).

Other examples are also possible—e.g., including a human driver operating the vehicle toward the geofence region 62. In at least one example, HMI device 32 may display information regarding the charging station 14 in a split-screen mode—as discussed above (and shown in FIG. 5). Further, when the vehicle enters or crosses boundary 60 of the geofence region 62, the HMI device 32 may be configured or programmed to switch to a full-screen mode (FIG. 6).

Process 900 can be executed with or without visual indicia and/or with or without visual alignment indicia. Thus, for purposes of illustration only, process 900 will be described in the context of a charging station without any roadway markings or other indicators of where vehicle 12 should be parked or located to receive a wireless charge. In other illustrative examples, the roadway 16 could have markings and indicia; however, the indicia may be covered with dirt, debris, snow, ice, leaves, etc. and/or the markings could be faded or worn appreciably so that sensor suite 92 onboard vehicle 12 may not be able to identify them.

In block 920 which follows, computer 30 may determine whether the vehicle 12 is within the geofence region 62. For example, charging station 14 may activate communication nodes 102-106 which may provide a relative indication of position to vehicle 12. For instance, computer 30 (via communication nodes of sensor suite 92) may determine whether vehicle 12 is positioned between nodes 102 and 106 using known position-measuring techniques such as received signal strength (e.g., RSSI), angle of arrival, time of flight, etc. Alternatively, or in combination therewith, computer 30 may receive an indication of vehicle position based on controller 122 measuring pressure sensor data using sensors 112, 114. These of course are merely examples and other techniques for positioning vehicle 12 within the geofence region 62 are also possible. When computer 30 determines that vehicle 12 is not within the region 62, then process 900 may loop back to block 910 and also repeat blocks 915 and 920. When computer 30 determines that vehicle 12 is within region 62 (or a threshold portion of vehicle 12 is within region 62), then process 900 may proceed to block 925.

In block 925, computer 30 may actuate the radar system 36. More particularly, computer 30 may control the antenna circuit 64—e.g., including direction, amplification, resolution, etc. As described above, radar system 36 may be configured to execute ground penetrating radar (GPR); thus, system 36 may provide GPR data to computer 30. This GPR data may be post-processed (e.g., transformed into localization-like data or the like), or it may be raw data permitting computer 30 to execute post-processing.

Other examples of block 925 exist as well. For example, radar system 36 could be actuated earlier—e.g., at or shortly after the charging station is identified (e.g., in block 905). In one example, a frequency of the radar signals is increased as vehicle 12 approaches the charging coil 26 or based on a threshold proximity thereto. Using lower frequencies (e.g., 210 MHz) when the vehicle 12 is farther from the charging coil 26 may improve ground penetration and range. And increasing the frequency (e.g., to 500 MHz) as the vehicle 12 gets closer to the charging coil 26 may provide greater resolution—e.g., and the faster attenuation rates may not impact ranging, as the vehicle 12 is sufficiently close to the target (e.g., coil 26).

In block 930, computer 30—using the GPR data—may determine the shape and centroid 56 of the charging coil 26 (of transmitter 24). For example, the GPR data may be used to formulate a two- or three-dimensional model, and using the model, the centroid may be calculated by computer 30.

It should be appreciated that the charging coil 26 may be in the inactive state—i.e., minimal to no current moving through the coil 26 while computer 30 is aligning the coil 25 to coil 26.

In block 935, computer 30 may determine the relative location of the centroid 56 with respect to reception coil 25 (of receiver 22). Block 935 may include determining a heading (or direction) and distance between axis 63 and centroid 56.

In block 940 which follows, computer 30 may compare the determination of block 935 to a threshold. According to one non-limiting example, computer 30 may determine whether a distance (between axis 63 and centroid 56) calculated in block 935 is less than or equal to a radius α (e.g., as shown in FIG. 10).

For example, FIG. 10 illustrates an exemplary coil 25 (of receiver 22) having axes x' and y' that correspond with a longitudinal axis x and a transverse axis y (of vehicle 12)—i.e., axis x is parallel to axis x', and axis y is parallel to axis y'. This orientation is for purposes of explanation only. Axes x'-y' may have a corresponding vertical axis as well—e.g., namely, axis 63 that may pass through centroid 84 of reception coil 25. FIG. 10 also illustrates radius α extending from an origin of axes x', y', 63. According to one example, radius α is a maximum threshold distance between axis 63 and centroid 56 (of charging coil 26)—e.g., to maximize charging rate efficiency (e.g., achieve 90-95% efficiency). Thus, as explained below, computer 30 and/or navigation system 34—using dead reckoning data—may control vehicle movement to move coils 25, 26 within threshold radius α. According to one example, radius α may be 5 cm; however, other values may be used instead.

Thus, in block 940, when the distance between axis 63 and centroid 56 is less than or equal to the threshold (e.g., radius α), then process 900 may proceed to block 950. And when the distance between axis 63 and centroid 56 is greater than the threshold (e.g., greater than radius α), then process 900 may proceed to block 945.

In block 945, computer 30 may utilize dead reckoning instructions to move vehicle 12 so that coils 25, 26 more closely align when the coil is recognized by radar. In fully-autonomous implementations, computer 30 may do this without user interaction. When a driver is exercising some control over vehicle 12, then the driver handover may be desirable. This may be accomplished by the driver providing input to computer 30 (e.g., via HMI device 32 or some other controls)—e.g., indicating that computer 30 may exercise control over vehicle 12 acceleration, braking, and steering. Regardless, computer 30 ultimately may control vehicle 12 according to a dead reckoning mode and incrementally move vehicle 12 so that coils 25, 26 approach alignment.

Following block 945, process 900 may loop back and re-determine block 940. Looping between blocks 940 and 945 may be recursive until the threshold of block 940 is satisfied.

According to one example of block 950, computer 30 may instruct the powertrain system of vehicle 12 to place the transmission in a PARK mode. Thereafter, computer 30 may communicate a readiness message to charging station 14 (e.g., via telematics device 38)—e.g., indicating that wireless charging may proceed.

In block 955 which follows, a wireless charge may be received at reception coil 25. More particularly, controller 122 may actuate a switch, connection, or the like between the power source 120 and coil 26—e.g., thereby generating flux and inducing current in coil 25. Based on the proximity of coil 26 to coil 25, wireless electric charge can be transferred. And based on proximity within a threshold (block 940), the charge may be more expeditiously carried out.

In block 960, computer 30 may monitor the charge of battery 90. When battery 90 reaches a threshold level of charge, computer 30 may determine to terminate wireless charging (proceeding to block 965). In other examples, additional charging may be required before the threshold level of charge is reached, and process 900 may loop back to block 955 and repeat. The threshold level of charge may be 100% or less. In some examples, it may include charging the battery 90 to a predetermined voltage level or the like.

In block 965, computer 30 may transmit, to transmitter 24, a wireless message to terminate charge transfer. In this manner, energy can be conserved at the charging station 14. In response, controller 122 may cease transmission of wireless charge. Of course, in block 965, computer 30 (or a human driver) could simply drive away from the charging station 14, and controller 122—using data from nodes 102-106 and/or sensors 112, 114—could determine the departure of vehicle 12 and terminate the wireless charge transfer. Following block 965, the process may end.

Process 900 could include other instructions as well. For example, having identified a location of charging station 14, computer 30 could store in memory 44 location data (e.g., a geotag) of the station 14 for future charging (e.g., if not already stored). For instance, when vehicle 12 is approaching the charging station 14 in the future (and in need of a charge), computer 30 may trigger stopping the vehicle 12 for a wireless charge based on a threshold proximity to the location. Or for example, a notification—as discussed above—could be presented to a human driver based on the threshold proximity.

In other examples, dead reckoning may not be used. For example, a human driver may use the single-screen mode (e.g., as shown in FIG. 6) to manually align vehicle 12 with charging coil 26. For example, the user may receive real-time positioning information regarding its coil 25 relative to the centroid 56 of coil 26.

According to at least one example, an autonomous part assist mode could be used to fix parking alignment. For example, a user may get the vehicle receiver partially over the coil, and then the vehicle may correct the positioning. In at least one example, once coils 25, 26 are adequately aligned, a human operator may provide an input to HMI device 32. Computer 30 may receive an indication of the input from HMI device 32 and, in response, permit wireless charging and/or provide a message to controller 122 to actuate the coil 26—e.g., a switch-actuation by a user of vehicle 12.

The description above discusses ways in which vehicle 12 may autonomously determine charging stations, autonomously align vehicle 12 with the charging coils, etc. According to at least one example, computer 30 may receive an indication that a user has manually turned on the wireless charging alignment mode via physical/software button.

Thus, there has been described a wireless charging system for a vehicle. The system can include a vehicle having an alignment system that includes a computer and a radio detection and ranging device to align the vehicle with an underground charging coil. Once aligned, the vehicle may receive a wireless charge.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method for wirelessly charging a vehicle, comprising:
   determining, via a computer, when a vehicle is within a geofence region that includes a charging coil embedded within a roadway;
   actuating, via the computer, a radar system to emit ground penetrating radar signals, wherein a frequency of the ground penetrating radar signals is increased as a distance between the vehicle and the charging coil decreases; and
   aligning a reception coil on the vehicle with the charging coil using ground penetrating radar data.

2. The method of claim 1, further comprising: receiving, via a human machine interface (HMI) device, an indication from a user prior to determining and aligning.

3. The method of claim 2, wherein the indication is based on roadway pressure sensor data.

4. The method of claim 2, wherein the indication is based on wireless signal strength data, angle of arrival data, or time of flight data.

5. The method of claim 1, wherein determining further comprises displaying an image of the vehicle and a charging station on a human machine interface (HMI) device.

6. The method of claim 5, wherein displaying further comprises transitioning from a split-screen mode to a full-screen mode as the vehicle moves into the region, wherein at least one screen portion of the human machine interface device comprises an image depicting a top view of the vehicle relative to a representation of the charging coil in the split-screen mode.

7. The method of claim 1, wherein the charging coil is in an inactive state during aligning.

8. The method of claim 1, further comprising charging a battery of the vehicle via the reception coil.

9. The method of claim 8, further comprising, when a threshold level of charge is received, transmitting a message, to a controller of the charging coil, to terminate charging.

10. The method of claim 1, wherein aligning further comprises autonomously controlling the vehicle using dead reckoning.

11. The method of claim 1, wherein aligning further comprises determining whether an axis of a reception coil on the vehicle is within a threshold distance of a centroid of the charging coil.

12. The method of claim 1, wherein during the aligning, the vehicle is in a fully-autonomous mode.

13. The method of claim 1, further comprising:
determining, via the computer, a shape of a centroid of the charging coil based on the ground penetrating radar data; and
aligning, via the computer, the vehicle until a distance between a vertically downwardly extending axis corresponding to the reception coil and the centroid is less than a distance threshold.

14. A method for wirelessly charging a vehicle, comprising:
actuating, via the computer, a radar system to emit ground penetrating radar signals, wherein a frequency of the ground penetrating radar signals is increased as a distance between the vehicle and the charging coil decreases;
determine a shape of a centroid of the charging coil based on ground penetrating radar data;
aligning a reception coil on a vehicle with a charging coil using ground penetrating radar data until a distance between a vertically downwardly extending axis corresponding to the reception coil and the centroid is less than a distance threshold; and then,
receiving inductive charge at the reception coil.

15. The method of claim 14, wherein the charging coil is in an inactive state during aligning.

16. The method of claim 14, wherein aligning further comprises autonomously controlling the vehicle using dead reckoning.

17. The method of claim 14, further comprising:
displaying an image at a human interface device, wherein the image depicts a top view of the vehicle relative to a representation of the charging coil.

18. A wireless charging system for a vehicle, comprising:
a processor; and
memory storing instructions executable by the processor to cause the processor to:
actuate a radar system to emit ground penetrating radar signals, wherein a frequency of the ground penetrating radar signals is increased as a distance between the vehicle and a charging coil decreases;
align a reception coil on the vehicle with the charging coil using the ground penetrating radar data; and then,
receiving inductive charge at the reception coil.

19. The system of claim 18, further comprising: an antenna circuit, comprising at least one antenna, configured to transmit and receive an ultra-wide band radio wave.

* * * * *